United States Patent [19]
Jones

[11] Patent Number: 5,773,039
[45] Date of Patent: Jun. 30, 1998

[54] APPARATUS FOR MULTIPLE WAX CASTINGS

[76] Inventor: Earl S. Jones, 4403 Elderon Ave., Baltimore, Md. 21215

[21] Appl. No.: 626,006

[22] Filed: Apr. 1, 1996

[51] Int. Cl.⁶ .......................... B29C 45/24; B29C 45/32; B29C 45/64

[52] U.S. Cl. .................... 425/186; 425/192 R; 425/225; 425/546; 425/564; 425/572; 425/589; 425/DIG. 44

[58] Field of Search ................................... 425/572, 564, 425/588, 546, 589, DIG. 44, 186, 192 R, 225

[56] References Cited

U.S. PATENT DOCUMENTS

| | | | |
|---|---|---|---|
| 2,448,640 | 9/1948 | Weston | 425/DIG. 44 |
| 2,658,237 | 11/1953 | Cuppett et al. | 425/DIG. 44 |
| 3,612,147 | 10/1971 | Kaplan | 164/45 |
| 3,981,661 | 9/1976 | Taylor | 425/572 |
| 4,256,444 | 3/1981 | Suter | 425/546 |
| 4,714,421 | 12/1987 | D'Agostino | 425/192 R |
| 4,732,204 | 3/1988 | Tabardin | 164/35 |
| 4,948,359 | 8/1990 | Yasui | 425/589 |
| 5,135,041 | 8/1992 | Goss | 164/290 |
| 5,198,232 | 3/1993 | Thornthwaite et al. | 425/DIG. 44 |
| 5,302,103 | 4/1994 | Brown et al. | 425/192 R |
| 5,451,155 | 9/1995 | Kok et al. | 425/186 |

FOREIGN PATENT DOCUMENTS

| | | | |
|---|---|---|---|
| 6-91697 | 4/1994 | Japan | 425/564 |
| 2033828 | 5/1980 | United Kingdom | 425/588 |

*Primary Examiner*—Robert Davis
*Attorney, Agent, or Firm*—Antonelli, Terry, Stout, & Kraus, LLP

[57] ABSTRACT

An apparatus for simultaneously casting a large volume of wax patterns in a reduced amount of time in an air-free environment. The invention utilizes a direct controlled pressure wax injection system to inject melted wax into a central portion of a multi-cavity rubber mold having an upper and lower portion, and then provides an evenly distributed clamping pressure to the mold.

20 Claims, 5 Drawing Sheets

5,773,039

APPARATUS FOR MULTIPLE WAX CASTINGS

BACKGROUND OF THE INVENTION

The present invention relates to an apparatus and method for simultaneously casting a plurality of wax patterns for use in the production of fine jewelry and the like. More particularly, the present invention relates to an apparatus and method for simultaneously casting a plurality of wax patterns in a multi-cavity mold by injecting wax in a vertical direction into the multi-cavity mold, wherein the mold is held so that the cavities extend in the horizontal direction and the wax is injected vertically into the mold in an air-free environment such that the wax is evenly distributed throughout all of the cavities.

Various conventional wax pattern casting methods and apparatuses have been disclosed. For instance, U.S. Pat. No. 4,732,204 describes an apparatus for horizontally injecting liquid wax into a clam type mold which contains a ceramic core having cavities therein. The apparatus described by U.S. Pat. No. 4,732,204 applies a sufficiently high clamping force on the mold to force the two halves of the mold together so as to permit the cavities of the ceramic core to be filled with wax. The apparatus described by U.S. Pat. No. 4,732,204 horizontally injects liquid wax into a clam type mold by injecting liquid wax into the mold by a nozzle at the point of separation between the two halves of the mold.

The apparatus taught by U.S. Pat. No. 4,732,204 suffers from various disadvantages. For example, the mold containing the ceramic core used for defining the cavities of the core traps air prior to injection of the liquid wax therein. The trapped air causes deficiencies in the wax patterns produced once the liquid wax is injected.

Further, extreme clamping force is required to hold the two halves of the mold together. The force required to hold the two halves of the mold together must overcome the force pushing the two halves of the mold apart resulting from the liquid wax flowing into the mold. A further force must also be provided to overcome the reaction force pushing the mold away from the nozzle at the point where the mold and the nozzle communicate with each other.

Still further, horizontal injection of liquid wax into a clam type mold taught by U.S. Pat. No. 4,732,204 is limited to producing a small number of casting at any given time due to the rapid hardening of the wax as it is injected to the mold and, subsequently, the cavities of the ceramic core. This rapid hardening of wax causes the wax to not be evenly distributed throughout the cavities of the ceramic core.

Still further yet, the complex patterns of the cavities of the ceramic core used in the mold of U.S. Pat. No. 4,732,204 require variable injection pressure. However, since the clamping force applied to the mold is a function of the wax injection pressure, accurate variance of injection pressure is not possible. Thus, incomplete deposition of the wax throughout the cavities of the ceramic core results.

Another apparatus for producing wax castings is described in U.S. Pat. No. 3,612,147 in which powdered wax is horizontally injected into a clam type mold and air-driven ram pressure is briefly applied to the powdered wax to aid in the injection. Molds which can withstand the forces resulting from the air-driven ram pressure are relatively expensive. Thus production costs when using this apparatus are relative high.

Conventional metal casting apparatuses include a centrifugal casting apparatus which casts a plurality of small metallic parts by spinning a multi-cavity mold. Thus, the centrifugal force created due to the spinning causes molten metal to flow into the cavities of the mold. Centrifugal casting apparatus suffers from various disadvantages.

For instance, U.S. Pat. No. 5,135,041 describes a multi-mold centrifugal casting apparatus in which a plurality of molds are stacked one on top of another. Molten metal is allowed to flow or is poured into each mold individually from a central manifold member, while the molds are spinning. The casting machine continues to spin the molds until the molten metal within each of the molds cools and then hardens.

In the apparatus taught by U.S. Pat. No. 5,135,041 by stacking the individual molds one on top of the other, there is no means provided to apply the extreme force necessary to hold the two halves of each of the molds together. Such force is necessary to counter the force resulting from the molten metal flowing into the mold.

Further, as with all centrifugal casting apparatuses, there are problems in that the molten metal must be heated well above melting temperature so as not to cool and harden while being poured into the mold and as a result of the turbulent air generated by the motion of the mold. In addition, since the molten metal must be provided at such high temperatures, long spin cycles are required in order to cool the metal within the molds. Also metal melted at such high temperatures tends to shrink excessively when finally cooled.

Still further, centrifugal forces resulting from spinning the molds causes molten metal from the center of the mold to be concentrated at the outer edges thereof. Thus, uneven distribution of the molten metal within each of the mold cavities results. Also air currents from the turning apparatus causes a cooling effect on the molten material prior to entering the mold that has to be compensated for.

SUMMARY OF THE INVENTION

An object of the present invention to provide an apparatus and method for simultaneously casting a plurality of wax patterns for use in the production of fine jewelry and the like.

Another object of the present invention is to provide an apparatus and method for simultaneously casting a plurality of wax patterns in a multi-cavity mold by injecting wax in a vertical direction in the multi-cavity mold.

Yet another object of the present invention is to provide an apparatus and method for simultaneously casting a plurality of wax patterns by vertically injecting wax into a mold having multiple cavities that extend in the horizontal direction such that the wax is evenly distributed throughout all of the cavities.

The present invention provides apparatus for casting a plurality of wax patterns by vertically injecting melted wax into a central portion of a multi-cavity rubber mold having upper and lower portions and evenly distributing clamping pressure to the mold to ensure even distribution of the melted wax to all of the cavities within the mold while holding the mold in an air-free environment. The present invention also provides apparatus for reducing the amount of wax waste at the point where the wax is injected into the mold.

The casting apparatus of the present invention includes a housing having a nozzle extending vertically in the top central portion of the housing and a cylinder disposed on the bottom control portion of the housing. An opening is provided on one side of the housing. The casting apparatus of the present invention also includes a drawer which can be inserted into and withdrawn from the opening in the housing. At one end of the drawer is provided a door which completely covers the opening in the housing when the drawer is fully inserted into the opening in the housing. A seal is located around the front edge of the housing to provide an air tight seal with the door when the drawer is fully inserted into the opening of the housing. Vacuum apparatus housing vacuum and return parts disposed in the housing is provided to evacuate air from inside of the housing when the door of the drawer forms an airtight seal with the housing and the casting process is initiated. Casting wax patterns in an air-free environment improves the quality of the castings.

A mold having multiple cavities and a central opening on a top portion is positioned on a base plate which is centrally disposed on a platform of the drawer. The platform of the drawer has an opening through which the cylinder disposed on the bottom central portion of the housing can be adjustably extended to thereby lift the base plate and, consequently, the mold so that the central opening of the mold engages the nozzle that is extended vertically from the top central portion of the housing. Once the nozzle is engaged with the central opening of the mold, melted wax is then injected by the nozzle into the mold to the plurality of cavities therein.

As the wax is injected into the mold the cylinder exerts a clamping pressure on the mold by extending vertically upward against the base plate so that the top portion of the mold is firmly pressed against the ceiling portion of the housing. Thus, the top and bottom portions of the mold are held together while countering the force of the injection of liquid wax into the mold which tends to cause the top and bottom portions of the mold to separate. Also by firmly pressing the top and bottom portions of the mold against the ceiling portion of the housing the reaction force, which tends to separate, the top central opening of the mold from being engaged with the nozzle is countered.

The nozzle is constructed so as to reduce wax waste by providing a rubber insert inside the nozzle. The rubber insert provided within the nozzle acts as a valve by cutting off the flow of wax when pressure being applied to the wax to cause injection falls below a predetermined level.

BRIEF DESCRIPTION OF THE DRAWINGS

The present invention will be more apparent from the following detailed description, when taken in conjunction with the accompanying drawings, in which.

DESCRIPTION OF THE PREFERRED EMBODIMENT

Figure 1:
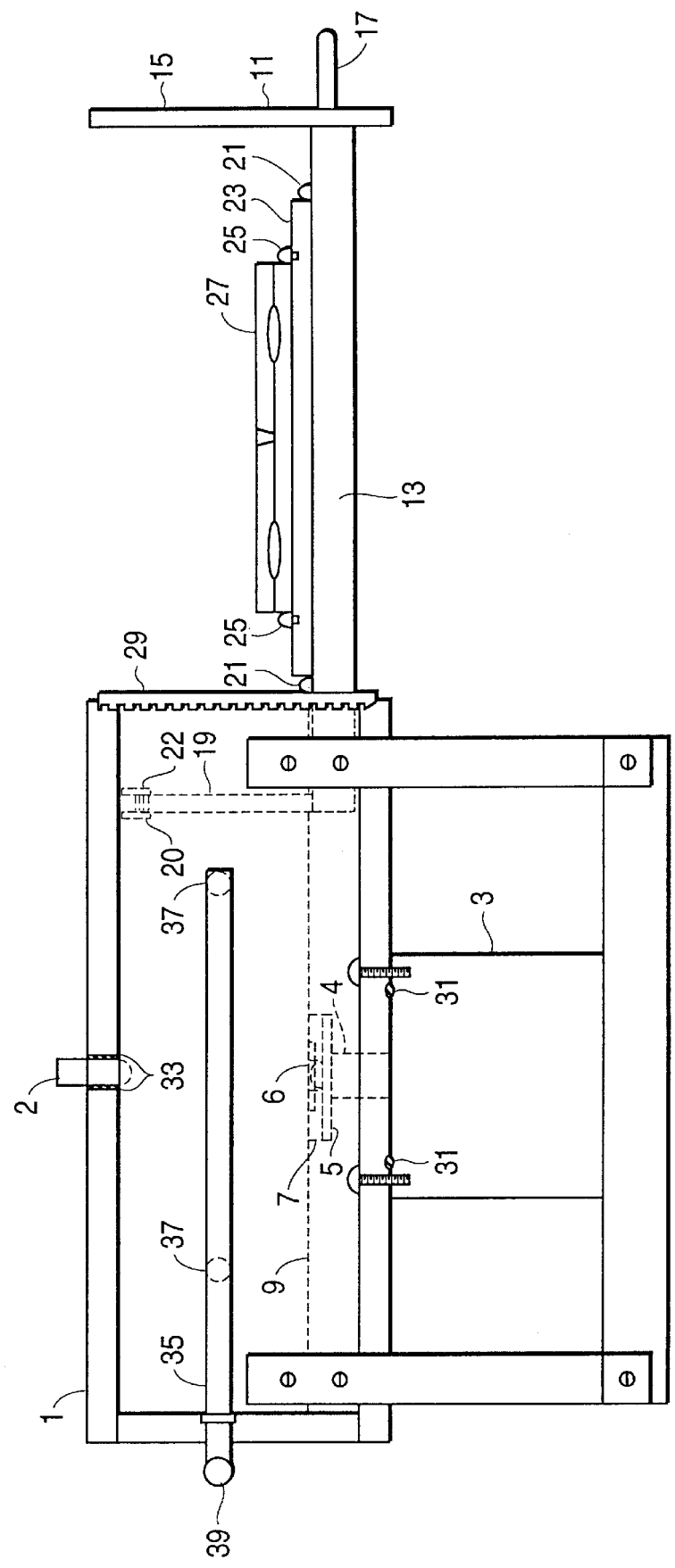
FIG. 1 illustrates a side view of a preferred embodiment of the present invention.

FIG. 1 shows a side view of the preferred embodiment of the casting apparatus for simultaneously casting a plurality of wax patterns according to the present invention. The housing of the apparatus is denoted by numeral 1. A nozzle 2 is disposed in the top central portion of the housing 1. The nozzle 2 extends vertically from the top control portion of the housing 1. Also provided in the housing 1 is a cylinder 3 disposed on the bottom central portion of the housing 1.

The cylinder 3 includes a shaft 4 which reciprocates in the vertical direction. Disposed at the end of the shaft 4 is a washer assembly having a lower steel washer 5, an upper steel washer 6 and a rubber grommet 7 sandwiched between the lower and upper steel washers 5 and 6 respectively.

Disposed horizontally on opposing sides of the housing are frame rails 9. The frame rails 9 run parallel to one another on opposing sides of housing 1. A drawer 11 is provided in an opening of the housing 1. The drawer 11 includes drawer rails 13, a door 15 provided at one end of the drawer rails 13 and a handle 17 attached to the outer surface of the door 15. The drawer rails 13 are able to run smoothly on the frame rails 9 allowing the drawer 11 to be inserted into and withdrawn from housing 1 when a user exerts the appropriate force on the handle 17 attached to the door 15 of the drawer 11. Drawer 11 further includes distal wall 19 upon which forward squeegees 20 and backward squeegees 22 are disposed. Squeegees 20 and 22 are disposed at a top central portion of the respective vertical portions of distal wall 19, extending higher than distal wall 19 itself so as to brush against the nozzle 2 in the ceiling of the housing 1 as the door 11 is inserted to and withdrawn from the housing 1. Squeegees 20 and 22 are utilized to wipe excess wax from nozzle 2 before and after operation of the present invention, which will be described below.

Attached to the drawer rail 13 are fixed locators 21 between which a pressure plate 23 is placed. The pressure plate 23 has detachably attached adjustable locators 25 between which is placed a multi-cavity mold 27. The adjustable locators 25 can be detached and re-attached at various positions on the pressure plate 23 so as to fit any size mold. The drawer rail 13 has an opening in a central portion thereof to permit the washer assembly disposed at the end of the shaft 4 of the cylinder 3 to reciprocate in the vertical direction. The washer assembly when moving in the upward direction engages the bottom of the pressure plate 23 through the opening in the drawer rail 13 and moves the pressure plate 23 having placed thereon the mold 27 in the upward direction.

A door seal 29 is provided around the opening in the housing 1 that accommodates the insertion and withdrawal of the drawer 11. The door seal 29 when in contact with the door 15 of the drawer 11 forms an airtight seal around the opening in the housing 1 when the drawer 11 is fully inserted into the housing 1. Cylinder seals 31 and nozzle seals 33 are provided about the cylinder 3 and nozzle 2 respectively.

A vacuum channel 35 is disposed on the inner surface of the housing 1 and extending through the wall of the housing 1. The vacuum channel 35 has internal vacuum ports 37 and an external vacuum ports 39. The external vacuum ports 39 can be connected to vacuum and return lines of a vacuum apparatus for evacuating air from internal of the housing 1 when the door seal 29 forms an air-tight seal with the door 15 of the drawer 11 and when the casting process is being conducted. The door seal 29 in combination with the cylinder and nozzle seals 31 and 33 and the internal vacuum ports 37 create an air-free environment during the casting process.

Figure 3A:
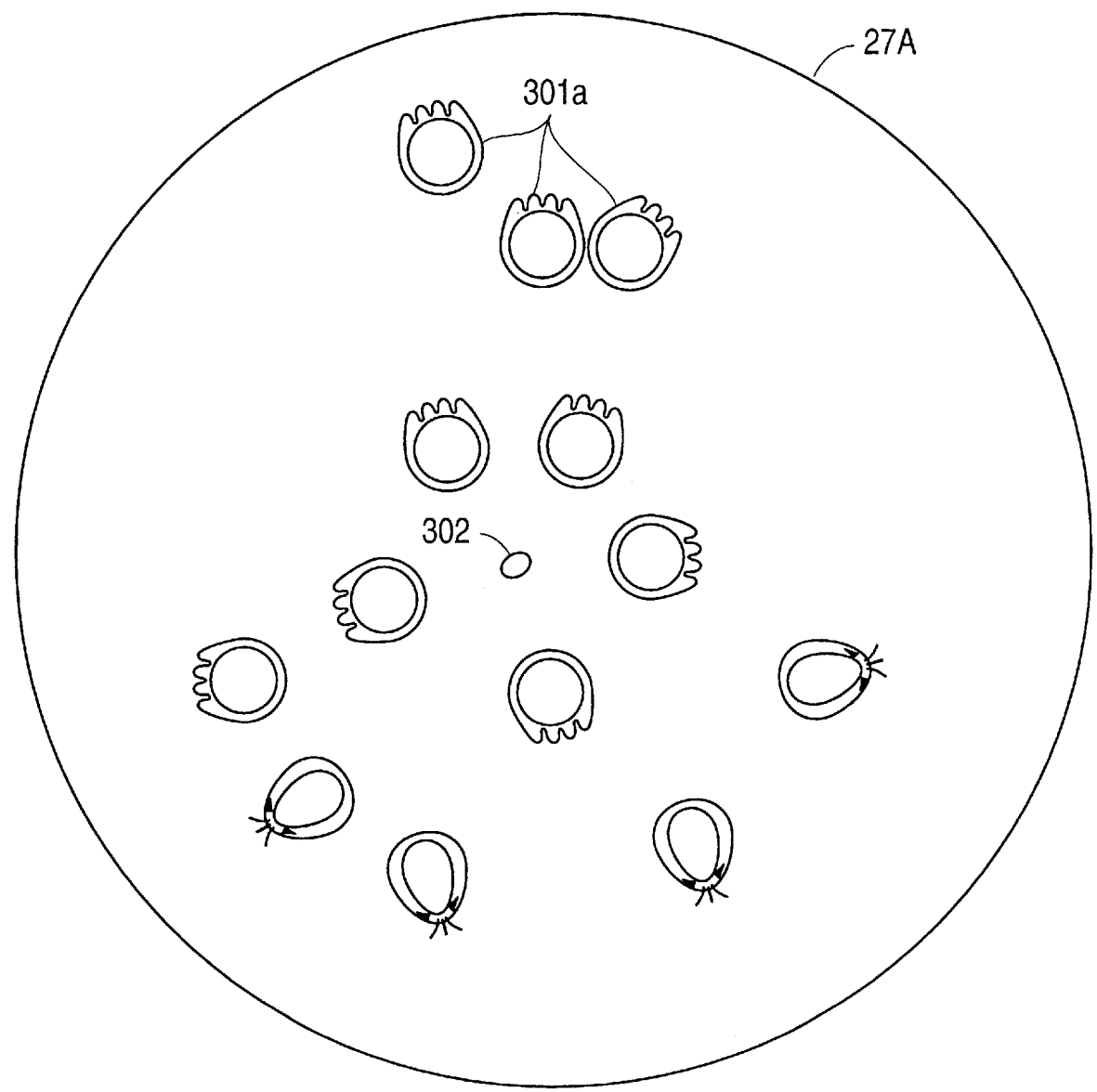
FIGS. 3a and 3b respectively illustrate the upper and lower portions of a multi-cavity rubber mold used in accordance with the present invention.
Figure 3B:
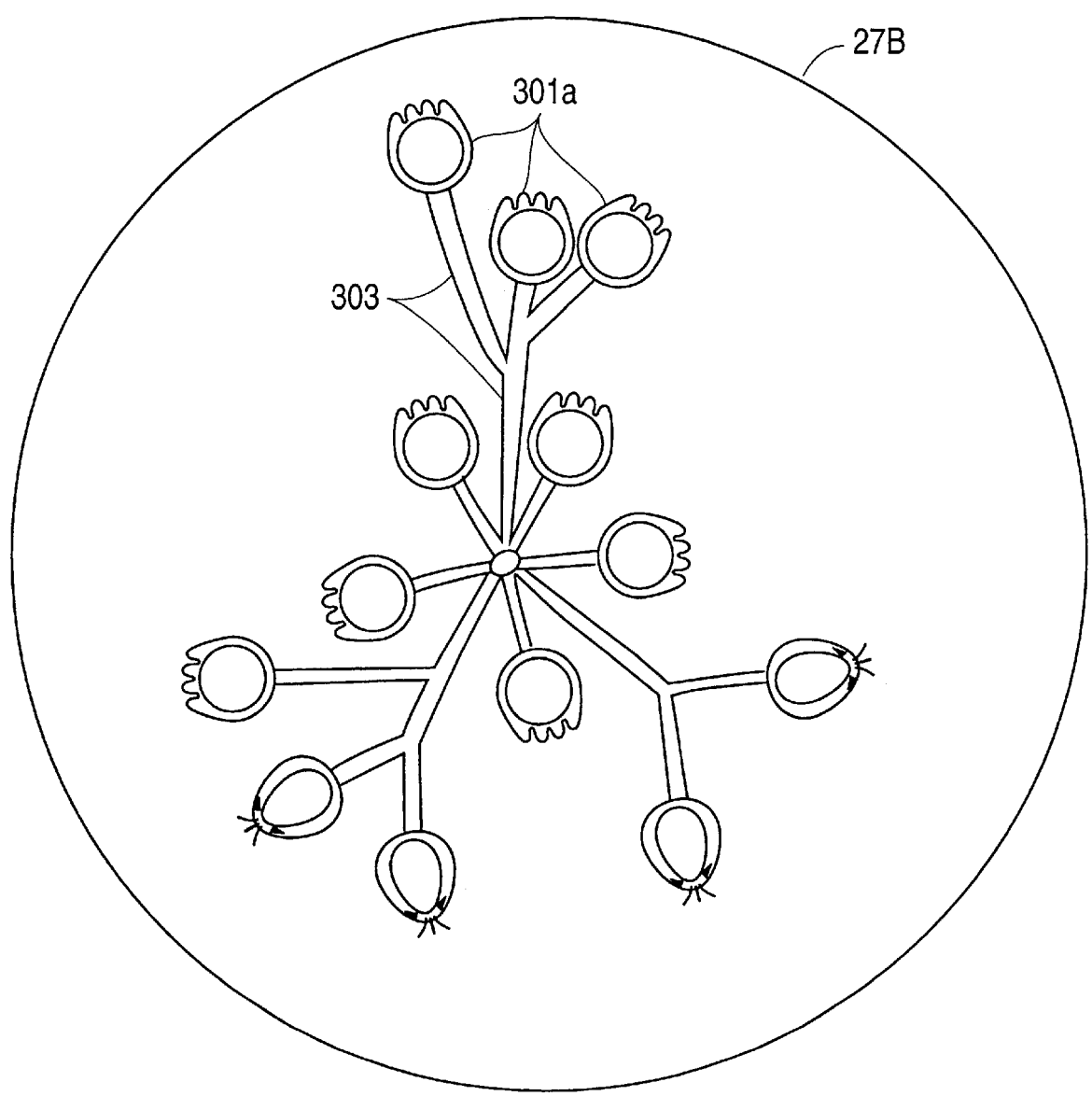

The multi-cavity rubber mold 27 illustrated in detail in FIGS. 3a and 3b is utilized so that a plurality of patterns may be cast simultaneously, which is a significant advantage over the single mold casting utilized in conventional clamp-casting techniques. FIG. 3a shows the upper portion of the mold 27A which includes a central opening 302 which engages the nozzle 2 to enable the vertical injection of wax into the combined mold so as to fill mold casting cavities 301a. FIG. 3b shows the lower portion of the mold 27B which does not have a central opening but does include canals 303 so that the wax injected vertically through central opening 302 may be evenly dispensed to the plurality of mold casting cavities 301a.

Figure 2:
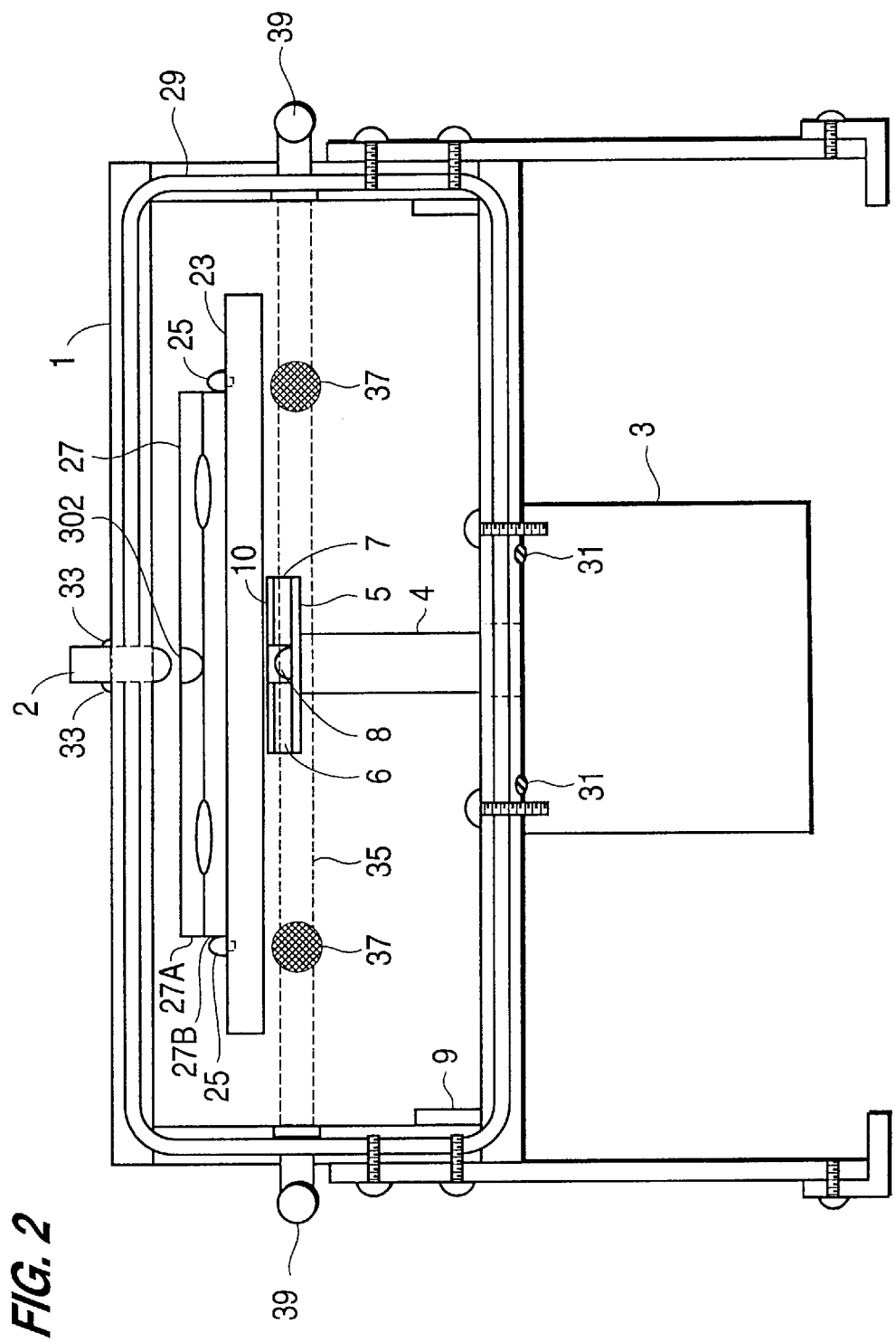
FIG. 2 illustrates a frontal view of the preferred embodiment of the present invention.

Performance of multiple wax castings according to the invention is described with further reference to FIG. 2 which is a front view of the casting apparatus of the present invention. First of all, the upper and lower portions of the mold 27 are properly fitted together so as to correspond the mold cavities of the upper and lower mold portions and are placed on the pressure plate 23, within the confines of the adjustable locators 25 with the central opening 302 of the upper portion 27A facing upward. The pressure plate 23 is secured in place horizontally, in relation to drawer 11, by fixed locators 21. The adjustable locators 25 can be adjusted to align variable sizes of the mold 27. Furthermore, the fixed locators 21 are disposed so that the center of the pressure plate 23, and therefore the central opening 302 of the mold 27, are aligned with the nozzle 2, of the housing 1 to enable the vertical injection of melted wax within the mold 27.

Therefore, after the mold 27 is properly placed on the pressure plate 23, the drawer 11 is closed by sliding the drawer rails 13 along the rail frames 9 of the housing 1. As the drawer 11 is inserted into the housing 1, nozzle squeegees 20 and 22 wipe excess wax and other impurities from the nozzle 2. It is noted that nozzle squeegees 20 and 22 are removable for cleaning.

Figure 4A:
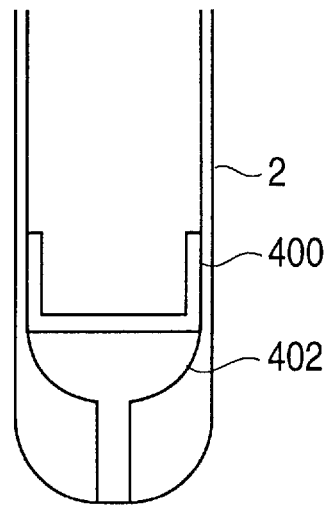
FIGS. 4a and 4b illustrate the internal construction of the nozzle.
Figure 4B:
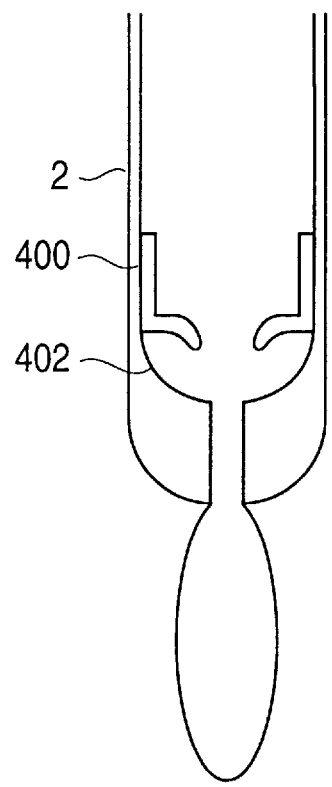

The casting apparatus of the present invention also provides further apparatus to reduce the amount of wax waste from the nozzle. As shown in FIGS. 4a and 4b the internal construction of the nozzle includes a rubber insert 400 disposed in the nozzle 2 near its tip. The rubber insert 400 has a slit 402 having opposing surfaces which are engaged with each other when the rubber insert is in the closed state.

The rubber insert 400 acts as a valve such that when the pressure of the wax flowing in the nozzle is below a predetermined threshold the slit 402 remains closed thereby preventing the flow of wax from the tip of the nozzle 2. When the pressure of the wax exceeds the predetermined threshold the slit 402 separates thereby allowing wax to flow from the tip of the nozzle. Thus, by use of the rubber insert in the nozzle 2 excess wax is prevented from dripping from the tip of the nozzle when the nozzle is not being used to inject wax into a mold.

When the drawer 11 is fully inserted within the housing 1. The door 11 engages the seal to form an air tight chamber from which air is removed through the internal and external vacuum ports 37 and 39 respectively. In this now air-free chamber the nozzle 2 in the upper central portion of the housing 1 the quality of castings are improved. The quality of the castings is further improved by placing the opening 302 at the center of the mold 27 in relation to the plurality of mold cavities 301. Based on this construction the melted wax can be quickly and evenly distributed to all of the mold cavities 301 via the canals 303 of the lower portion of the mold 27B. Thus, the wax need only be melted at a reasonable temperature so as to ensure minimal shrinkage upon hardening thereof. That is, the wax does not have to be melted at such a high temperature that the wax shrinks excessively upon hardening in order to obtain even distribution of the wax.

As a further feature of the automated wax casting process, upon quick and even distribution of the melted wax to all of the mold cavities 301, cylinder 3, centrally disposed at a lower portion of housing 1, is activated to apply clamping pressure upon the mold 27 only after air is removed from housing via vacuum ports 37 and 39 in housing. Specifically, when activated, the shaft 4 is extended upwards from its dormant position in cylinder 3, wherein the washer assembly engages the pressure plate 23. As the shaft 4 rises upwards from cylinder 3, it extends through an appropriately sized opening in the drawer 11. Secure engagement of washer assembly and pressure plate 23, and therefore proper alignment thereof, is provided by the lower and upper washers 5 and 6 and rubber grommet 7 which are attached to the end of the shaft 4. The washer assembly evenly distributes clamping pressure to pressure plate 23 when the shaft is fully extended and the upper portion of the mold 27A engages the ceiling of the housing 1. Further, a cylinder nodule 8, which extends through a central portion opening in the upper washer 6 and the rubber grommet 7, is engaged with a plate washer 10 which is centrally located on a bottom portion of pressure plate 23 and is also pivoted so as to receive cylinder nodule 8. As the shaft 4 is further extended upwards to apply the appropriate predetermined clamping pressure upon the mold 27, the pressure plate 23 is lifted from its position on the base platform of the drawer 11 until the upper portion of the mold 27A is pressed against the ceiling of the housing 1. As the mold 27 is held against the ceiling of the housing 1 the central opening 302 of the upper portion of the mold 27A engages the nozzle 2. Molten wax is then injected into the mold 27 via the nozzle 2. Before the wax is injected into the mold 27 air is evacuated from the housing through the vacuum ports 37 and 39. As a result of the clamping pressure being applied to the mold 27 in the air-free environment there is no air to trap or inhibit even wax flow into the mold cavities.

After the predetermined clamping pressure has been applied to the mold 27 for an appropriate amount of time, shaft 4 is lowered, thus returning the pressure plate 23, upon which the mold 27 is disposed, to its appropriate position on the base platform of the drawer 11. The vacuum is released, air reenters housing 1 through vacuum ports 37 and 39. The user then withdraws the drawer 11 from the housing 1 to remove the mold 27. As the drawer rails 13 are withdrawn from the rail frames 9 to open the drawer 11, nozzle squeegees 20 and 22 again brush against the nozzle 2 to wipe excess wax off of the nozzle 2. Subsequently, upon removing the upper portion of the mold 27A from the lower portion of the mold 27B, the user possesses a plurality of wax castings. The wax castings experience minimal shrinkage and maximum fill without the entrapment of air, due to injection into an air-free mold, of wax melted at a moderate temperature as described above. Furthermore, the wax in the individual castings is evenly distributed, since the present invention does not require any centrifugal spinning of the mold which unevenly distributes wax to the outer edges of the mold cavities, and because of the evenly distributed clamping pressure applied to the mold.

The above disclosure includes a description of a specific embodiment of the present invention. However, it is manifest to those skilled in the art that various modifications and rearrangements of the apparatus may be made without departing from the spirit and scope of the underlying inventive concept, and that the present invention is not limited to the particular forms shown herein.

What is claimed:

1. An apparatus for automated casting of a plurality of wax patterns, comprising:
   a nozzle;

a housing having said nozzle centrally located therein and a seal on the front edge to seal when engaging a door;

a drawer having a platform and said door, said drawer being removable from said housing;

a removable base plate centrally disposed on said platform of said drawer, wherein a mold having a central opening on a top portion thereof and a plurality of mold cavities for forming said wax patterns is placed on top of said base plate, and wherein when said drawer is closed and said platform is disposed within said housing, said central opening of said mold is vertically aligned with said nozzle; and a cylinder which adjustably extends through an opening in said platform of said drawer for lifting said base plate within said housing after air is vacuumed from said housing, wherein said cylinder lifts said base plate to align said central opening of said mold placed atop of said base plate with said nozzle, so that said nozzle engages said mold to vertically inject melted wax therein, and wherein said cylinder applies evenly distributed clamping pressure to said base plate by pressing the top portion of said mold against a ceiling portion of said housing while the melted wax is being vertically injected into the mold.

2. The apparatus for automated casting of a plurality of wax patterns of claim 1, further comprising a distal wall vertically disposed at a distal end of said drawer opposite said door, wherein squeegees which are positioned at a top portion of said distal wall and which extend beyond the top portion of said distal wall are utilized to wipe excess wax from said nozzle as said drawer is opened and closed.

3. The apparatus for automated casting of a plurality of wax patterns of claim 1, wherein said mold includes an upper half which has said central opening through which said nozzle vertically injects the melted wax and a lower half which connects the plurality of mold cavities via a series of canals originating directly underneath the central opening of the upper half of the mold.

4. The apparatus for automated casting of a plurality of wax patterns of claim 1, wherein the injection of melted wax into the mold by said nozzle and the application of clamping pressure onto said mold by said cylinder and vacuum of said housing are independent functions.

5. An apparatus for automated casting of a plurality of wax patterns, comprising:

a nozzle;

a housing having said nozzle located therein;

a removable base plate disposed in said housing, wherein a mold having an opening on a top portion thereof and a plurality of mold cavities for forming said wax patterns is placed on top of said base plate, and wherein said opening of said mold is vertically aligned with said nozzle; and a cylinder for lifting said base plate within said housing after air is vacuumed from said housing, wherein said cylinder lifts said base plate to align said opening of said mold placed on top of said base plate with said nozzle, so that said nozzle engages said mold to vertically inject melted wax therein, and wherein said cylinder applies evenly distributed clamping pressure to said base plate by pressing the top portion of said mold against a ceiling portion of said housing while the melted wax is being vertically injected into the mold.

6. An apparatus according to claim 5, further comprising:

a drawer removable from said housing upon which said base plate is disposed, wherein said drawer when in an open position allows access to said base plate and said mold placed thereon and when in a closed state aligns said opening of said mold vertically with said nozzle.

7. An apparatus according to claim 6, further comprising:

a seal on the front edge of said housing; and a door attached to a front end of said drawer, wherein said door engages said seal so as to form an air tight seal with said housing when said drawer is in said closed position.

8. An apparatus according to claim 7, further comprising:

a distal wall vertically disposed at a rearend of said drawer opposite said door, wherein squeegees which are positioned at a top portion of said distal wall and which extend beyond the top portion of said distal wall are utilized to wipe excess wax from said nozzle as said drawer moves between said open position and said closed position.

9. An apparatus for automated casting of a plurality of wax patterns of claim 5, wherein said mold includes an upper half which has said opening through which said nozzle vertically injects the melted wax and a lower half which connects the plurality of mold cavities via a series of canals originating directly underneath said opening of the upper half of the mold.

10. An apparatus for automated casting of a plurality of wax patterns of claim 6, wherein said mold includes an upper half which has said opening through which said nozzle vertically injects the melted wax and a lower half which connects the plurality of mold cavities via a series of canals originating directly underneath said opening of the upper half of the mold.

11. An apparatus according to claim 5, wherein the injection of melted wax into the mold by said nozzle and the application of clamping pressure onto said mold by said cylinder and vacuum of said housing are independent functions.

12. An apparatus according to claim 6, wherein the injection of melted wax into the mold by said nozzle and the application of clamping pressure onto said mold by said cylinder and vacuum of said housing are independent functions.

13. An apparatus according to claim 6 wherein said base plate is disposed on a platform of said drawer between base plate locators.

14. An apparatus according to claim 1 wherein said base plate is disposed on a platform of said drawer between base plate locators.

15. An apparatus according to claim 1 wherein said mold is disposed on top of said base plate between mold locators.

16. An apparatus according to claim 5 wherein said mold is disposed on top of said base plate between mold locators.

17. An apparatus according to claim 6 wherein said mold is disposed on top of said base plate between mold locators.

18. An apparatus according to claim 1 wherein said nozzle comprises:

a rubber insert disposed within said nozzle near the tip of said nozzle, wherein said rubber insert has a slit therein having opposing surfaces which are engaged with each other when said rubber insert is in a closed state and not engaged with each other when said rubber insert is in an open state, and wherein said open state is caused by pressure from the melted wax exceeding a predetermined threshold.

19. An apparatus according to claim 5 wherein said nozzle comprises:

a rubber insert disposed within said nozzle near the tip of said nozzle, wherein said rubber insert has a slit therein having opposing surfaces which are engaged with each other when said rubber insert is in a closed state and not engaged with each other when said rubber insert is in an open state, and wherein said open state is caused by pressure from the melted wax exceeding a predetermined threshold.

20. An apparatus according to claim 6 wherein said nozzle comprises:

a rubber insert disposed within said nozzle near the tip of said nozzle, wherein said rubber insert has a slit therein having opposing surfaces which are engaged with each other when said rubber insert is in a closed state and not engaged with each other when said rubber insert is in an open state, and wherein said open state is caused by pressure from the melted wax exceeding a predetermined threshold.

* * * * *